United States Patent
Ohmura

(12) 
(10) Patent No.: US 9,025,978 B2
(45) Date of Patent: May 5, 2015

(54) IMAGE FORMING APPARATUS AND METHOD OF FORMING IMAGE

(75) Inventor: Yuuji Ohmura, Ibaraki (JP)

(73) Assignee: Ricoh Company, Ltd., Tokyo (JP)

(*) Notice: Subject to any disclaimer, the term of this patent is extended or adjusted under 35 U.S.C. 154(b) by 77 days.

(21) Appl. No.: 13/478,533

(22) Filed: May 23, 2012

(65) Prior Publication Data

US 2012/0300235 A1    Nov. 29, 2012

(30) Foreign Application Priority Data

May 27, 2011   (JP) ................................. 2011-118927
May 22, 2012   (JP) ................................. 2012-116969

(51) Int. Cl.
| G03G 15/20 | (2006.01) |
| G03G 15/00 | (2006.01) |
| G03G 15/16 | (2006.01) |
| H04N 1/40  | (2006.01) |

(52) U.S. Cl.
CPC ........ *G03G 15/1635* (2013.01); *G03G 15/1665* (2013.01); *H04N 1/40* (2013.01)

(58) Field of Classification Search
CPC ..................................................... G03G 15/16
USPC ........................................ 358/1.9; 399/45, 66
See application file for complete search history.

(56) References Cited

U.S. PATENT DOCUMENTS

| 4,392,738 | A  | * | 7/1983  | Fujino et al. ................... 399/317 |
| 5,172,175 | A  | * | 12/1992 | Sekino et al. ................... 399/299 |
| 5,633,703 | A  | * | 5/1997  | Takenouchi et al. .......... 399/315 |
| 7,953,335 | B2 |   | 5/2011  | Kuwabara et al. |
| 2001/0010769 | A1 | * | 8/2001  | Ishii et al. ..................... 399/388 |
| 2004/0046315 | A1 | * | 3/2004  | Jewell ........................... 271/262 |
| 2004/0119807 | A1 | * | 6/2004  | Fujiwara ....................... 347/218 |
| 2005/0117940 | A1 | * | 6/2005  | Taguchi ......................... 399/316 |
| 2005/0191071 | A1 | * | 9/2005  | Katayanagi et al. ............. 399/45 |
| 2006/0198670 | A1 | * | 9/2006  | Baba et al. ..................... 399/323 |
| 2007/0018383 | A1 | * | 1/2007  | Ohara et al. .................. 271/262 |
| 2007/0212130 | A1 |   | 9/2007  | Kuwabara et al. |
| 2009/0252508 | A1 | * | 10/2009 | Yamane .......................... 399/44 |
| 2010/0310293 | A1 | * | 12/2010 | Soga ............................. 399/395 |
| 2012/0160117 | A1 | * | 6/2012  | Ohmura ......................... 101/228 |
| 2013/0334014 | A1 | * | 12/2013 | Mashiko et al. ............... 198/847 |

FOREIGN PATENT DOCUMENTS

| JP | 07-330186 | 12/1995 |
| JP | 09-146429 | 6/1997  |

(Continued)

OTHER PUBLICATIONS

JP 10307483 A, Kurohane, Nov. 1998 English Language Machine Translation.*

(Continued)

*Primary Examiner* — Marivelisse Santiago Cordero
*Assistant Examiner* — Daryl Jackson
(74) *Attorney, Agent, or Firm* — IPUSA, PLLC

(57) ABSTRACT

An image forming apparatus includes an image holding body on which a toner image is formed; a transfer unit that functions to transfer the toner image formed on the image holding body onto a recording medium; and an adjusting unit that adjusts a gap between the transfer unit and the image holding body based on the rigidity of the recording medium, the recording medium being conveyed through the gap with respect to the image holding body.

17 Claims, 15 Drawing Sheets

(56) References Cited

FOREIGN PATENT DOCUMENTS

| | | | |
|---|---|---|---|
| JP | 10307483 A * | 11/1998 | ............ G03G 15/16 |
| JP | 2000-172090 | 6/2000 | |
| JP | 3379552 | 2/2003 | |
| JP | 3588171 | 11/2004 | |
| JP | 3612982 | 1/2005 | |
| JP | 3691578 | 9/2005 | |
| JP | 2006072108 A * | 3/2006 | |
| JP | 2007-022760 | 2/2007 | |
| JP | 2007-047195 | 2/2007 | |
| JP | 2007-084285 | 4/2007 | |
| JP | 2007-144666 | 6/2007 | |
| JP | 2007-199278 | 8/2007 | |
| JP | 2007-308269 | 11/2007 | |
| JP | 2008-203309 | 9/2008 | |
| JP | 2008-257225 | 10/2008 | |

OTHER PUBLICATIONS

JP 2006072108 A ODA, Mar. 2006 English Langauge Machine Translation.*

* cited by examiner

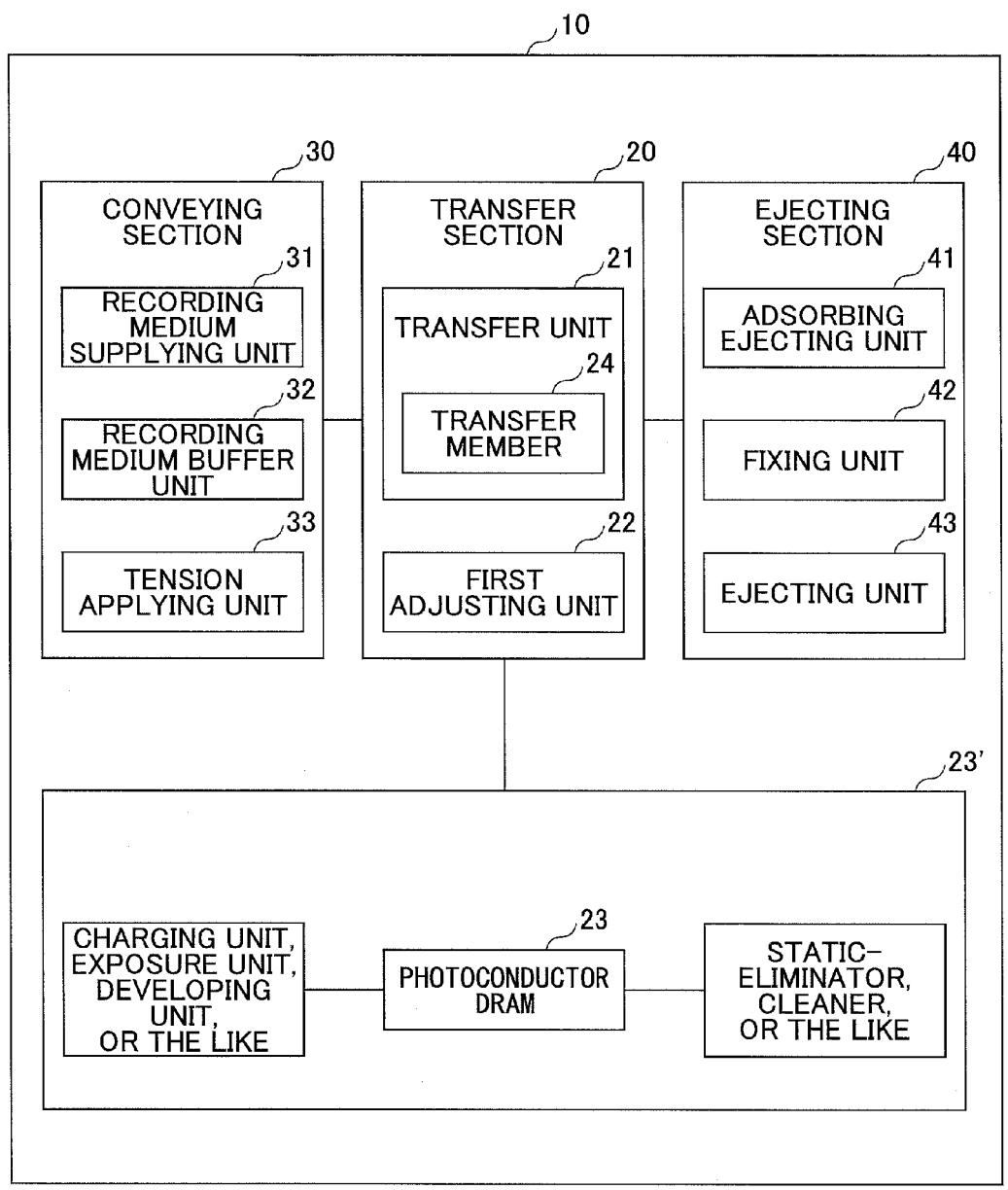

IMAGE FORMING APPARATUS AND METHOD OF FORMING IMAGE

BACKGROUND OF THE INVENTION

1. Field of the Invention

The present invention relates to an image forming apparatus and a method of forming an image.

2. Description of the Related Art

An image forming apparatus including a conveying unit that conveys a recording medium from a supplying unit, a transfer unit that transfers a toner image formed on a photoconductor drum onto the recording medium, and an ejecting unit that fixes the toner on the recording medium and ejects the recording medium on which the image is formed, is known.

Conventionally, for the image forming apparatus, because there is a desire to use a thin paper as the recording medium and further in order for the recording medium to contact the photoconductor drum, the recording medium is conveyed while being in contact with the photoconductor drum.

On the other hand, an image forming apparatus capable of forming an image on various kinds of recording mediums has been developed. The recording medium having a thicker thickness, generally, has a high rigidity so that a force applied to the photoconductor drum when being conveyed becomes strong. Therefore, mechanical wear of the photoconductor drum is increased to shorten the lifetime of the photoconductor drum.

In an image forming apparatus disclosed in Patent Document 1, a distance between guides for guiding a recording medium provided at upstream and downstream of the conveying direction is changed to increase electrostatic attraction of a recording medium and a photoconductor drum.

In an image forming apparatus disclosed in Patent Document 2, a distance between a photoconductor drum and a static eliminator is decreased to increase static eliminating efficiency.

In an image forming apparatus disclosed in Patent Document 3, a paper conveying mechanical unit is detachably attached to a photoconductor drum.

In an image forming apparatus disclosed in Patent Document 4, a buffer unit is provided for preventing a looseness of a recording medium which is generated by a movement of guides that guide the recording medium when starting the image formation and finishing the image formation.

However, a problem of the mechanical wear of the photoconductor drum or the like which is caused by using the various kinds of recording mediums is not considered.

PATENT DOCUMENT

[Patent Document 1] Japanese Laid-open Patent Publication No. 2000-172090
[Patent Document 2] Japanese Laid-open Patent Publication No. H09-146429
[Patent Document 3] Japanese Laid-open Patent Publication No. H07-330186
[Patent Document 4] Japanese Laid-open Patent Publication No. 2007-308269

SUMMARY OF THE INVENTION

The present invention is made in light of the above problems, and provides an image forming apparatus and a method of forming an image capable of suppressing increase of wear of a photoconductor drum by a recording medium when using various kinds of recording mediums.

According to an embodiment, there is provided an image forming apparatus including an image holding body on which a toner image is formed; a transfer unit that functions to transfer the toner image formed on the image holding body onto a recording medium; and an adjusting unit that adjusts a gap between the transfer unit and the image holding body based on rigidity of the recording medium, the recording medium being conveyed through the gap with respect to the image holding body.

According to another embodiment, there is provided a method of forming an image by an image forming apparatus including a photoconductor drum on which a toner image is formed and a transfer unit, including adjusting a gap between the transfer unit and the image holding body based on rigidity of a recording medium which is to be conveyed through the gap with respect to the image holding body; and transferring the toner image formed on the image holding body onto the recording medium.

Note that also arbitrary combinations of the above-described constituents, and any exchanges of expressions in the present invention, made among method, device, system, recording medium, computer program, data structure and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 1 is a block diagram showing an example of an image forming apparatus of an embodiment;

DETAILED DESCRIPTION OF THE PREFERRED EMBODIMENTS

Figure 2A:
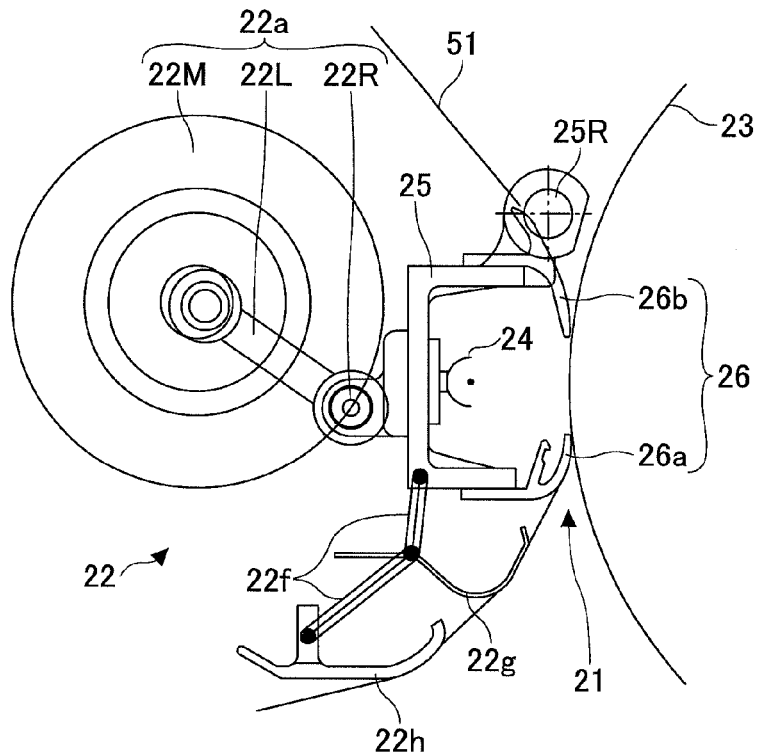
FIG. 2A and FIG. 2B are enlarged cross-sectional views showing the main part of a transfer unit of a transfer section.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following embodiment, an image forming apparatus including a transfer unit including a transfer member such as a transfer corotron (an electrostatic charging device using a corona discharge) or the like is explained. In this embodiment, the image forming apparatus may be any kind of apparatus such as a printer, a copying machine, a facsimile machine or the like capable of transferring a toner image to a recording medium by using a photoconductor drum.

First Embodiment

An image forming apparatus of a first embodiment is explained with reference to drawings.

FIG. 1 is a block diagram showing an example of an image forming apparatus 10 of the embodiment. The image forming apparatus 10 includes a transfer section 20, a conveying section 30, an ejecting section 40 and a structure 23' related to a photoconductor drum 23 (an example of an image holding body).

The transfer section 20 functions to transfer a toner image onto a recording medium. The transfer section 20 includes a transfer unit 21 and a first adjusting unit 22 (an example of an adjusting unit).

The transfer unit 21 includes a transfer member 24 that transfers a toner image formed on the photoconductor drum 23 onto the recording medium. The transfer member 24 may be a noncontact type. The transfer member 24 may be a transfer corotron, a transfer brush, a transfer roller or the like. In this embodiment, the transfer member 24 is the transfer corotron which performs a corona discharge by a corona charger that does not include a grid electrode.

The first adjusting unit 22 adjusts a distance (gap or space) between the transfer unit 21 and the photoconductor drum 23. The first adjusting unit 22 adjusts the distance between the transfer unit 21 and the photoconductor drum 23 based on the rigidity of the recording medium. Further, the first adjusting unit 22 of the embodiment may adjust the distance between the transfer unit 21 and the photoconductor drum 23 based on the rigidity of the recording medium and the thickness of the recording medium. Further, the first adjusting unit 22 may adjust the distance between the transfer unit 21 and the photoconductor drum 23 based on the rigidity of the recording medium, the thickness of the recording medium, and other conditions such as, for example, a tension applied to the recording medium, a difference in moisture absorption between an outer side portion and an inner side portion of the recording medium when the recording medium is provided in a rolled form, a difference in rolled condition between the outer side portion and the inner side portion of the recording medium when the recording medium is provided in a rolled form based on the difference in curvature, or the like.

The conveying section 30 function to convey the recording medium within the gap between the transfer unit 21 and the photoconductor drum 23. The conveying section 30 includes a conveying unit such as a roller, a belt, a guide, a tractor or the like, a recording medium supplying unit 31, a recording medium buffer unit 32, a tension applying unit 33 and the like.

The recording medium supplying unit 31 introduces the recording medium into the image forming apparatus 10. The recording medium buffer unit 32 is positioned upstream of the transfer unit 21, and temporarily retains the recording medium before forming the image by the transfer unit 21 on the recording medium. The tension applying unit 33 applies an appropriate tension to the recording medium while the recording medium is being conveyed for suppressing the generation of waves or folding.

The recording medium supplied by the recording medium supplying unit 31 is retained in the recording medium buffer unit 32, and is conveyed in a conveying direction (which will be referred to as a "downstream direction" hereinafter) toward the transfer unit 21 via the tension applying unit 33 or the like.

The ejecting section 40 functions to convey the recording medium, on which the toner image is transferred, in the downstream direction. In this embodiment, the ejecting section 40 includes an adsorbing ejecting unit 41, a fixing unit 42, an ejecting unit 43 and the like.

The adsorbing ejecting unit 41 conveys the recording medium, on which the toner image is transferred, in the downstream direction while holding the recording medium. The fixing unit 42 melts and fixes the toner image transferred on the recording medium to fix the toner. The ejecting unit 43 conveys the recording medium to a further downstream printer, a post-processing apparatus or the like.

In this embodiment, the recording medium may be a continuous medium on which the image is formed. For the recording medium, a paper medium, an overhead projector sheet (OHP sheet), a resin film, a metal thin film or the like may be used. In this embodiment, the recording medium is a continuous form paper (which will be referred to as a "web" hereinafter). The kinds of continuous form papers may be a thin paper, a thick paper, a wood free paper, a rough surface paper or the like.

The structure 23' related to the photoconductor drum 23 includes a charging unit that applies a charge on the photoconductor drum 23, an exposure unit that includes a light source to irradiate a light on the photoconductor drum 23 to form an electrostatic latent image on the photoconductor drum 23, a developing unit that develops a toner image on the photoconductor drum 23, a static eliminator that eliminates the charge on the photoconductor drum 23, a cleaner and the like. The basic structure and the mechanism (charging, forming the electrostatic latent image, developing, eliminating the charge, or the like) of the components related to the photoconductor drum 23 are the same as the conventional structure. Therefore, further explanation is not provided here.

Figure 2B:
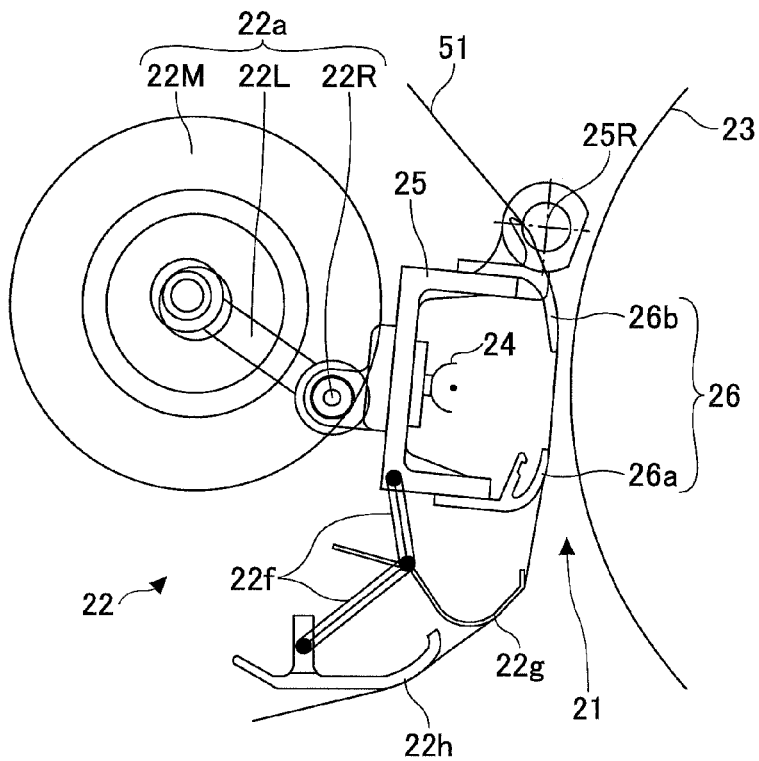

Next, the transfer section 20 of the image forming apparatus 10 is explained in detail with reference to FIG. 2A and FIG. 2B. FIG. 2A and FIG. 2B are enlarged cross-sectional views showing the main part of the transfer unit 21 of the transfer section 20. FIG. 2A is an enlarged view of the transfer unit 21 when forming the image (when transferring the image) and FIG. 2B is an enlarged view of the transfer unit 21 when waiting for the image formation.

As explained above, the transfer section 20 includes the transfer unit 21, first adjusting unit 22, a curved frame 22f, a conveying rail guide 22h, and a path adjusting guide 22g. The transfer unit 21 includes the transfer member 24, a transfer member housing 25, a guide unit 26 and the like, in this embodiment.

The transfer member 24 transfers the toner image exposed on the photoconductor drum 23 onto a web 51 (recording medium). The transfer member 24 is positioned to face the photoconductor drum 23. The transfer member housing 25 supports the transfer member 24. In this embodiment, the transfer member housing 25 has a "C" shaped cross-sectional structure and supports the transfer member 24 in its inside. Further, the transfer member housing 25 supported by an oscillation shaft 25R is capable of being oscillated with respect to the photoconductor drum 23.

The guide unit 26 determines a conveying path of the web 51 at the gap between the transfer member 24 and the photoconductor drum 23. In this embodiment, the guide unit 26 has an introducing guide including an upstream introducing guide 26a and a downstream introducing guide 26b. The upstream introducing guide 26a and the downstream introducing guide 26b are provided at an opening portion of the transfer member housing 25 to face the photoconductor drum 23 in a substantially parallel relationship with the photoconductor drum 23. The upstream introducing guide 26a and the downstream introducing guide 26b respectively include curved plates having curved surfaces substantially symmetry to the curve of the photoconductor drum 23.

The web 51 is conveyed along a curvature of the curved surfaces of the upstream introducing guide 26a and the downstream introducing guide 26b. The guide unit 26 may be alternatively include a flat plate, a curved plate, a pin, a roller, a belt or the like capable of determining the conveying path of the web 51 instead of the upstream introducing guide 26a and the downstream introducing guide 26b.

The first adjusting unit 22 expands the distance between the transfer unit 21 and the photoconductor drum 23 or shortens the distance between the transfer unit 21 and the photoconductor drum 23.

In this embodiment, the first adjusting unit 22 includes a link mechanism 22a. The link mechanism 22a includes a motor 22M, a link member 22L, and a rotation connecting portion 22R.

The link member 22L is rotatably connected to the transfer member housing 25 by the rotation connecting portion 22R. The link member 22L is eccentrically supported by a rotator of the motor 22M.

The motor 22M and the link member 22L compose a cam mechanism that converts a rotary motion of the motor 22M to a linear stroke of the link member 22L. The transfer member housing 25 is moved close to the photoconductor drum 23 and moved farther from the photoconductor drum 23 by the linear stroke of the link member 22L.

The first adjusting unit 22 of the embodiment may be any mechanisms, other than the link mechanism 22a, such as a stepping motor, an electromagnetic force actuator or the like, for example, that can move the transfer unit 21 closer to and farther from the photoconductor drum 23 by a linear or rotary motion. Further, a sensor for detecting the position of the transfer unit 21 may be further provided and a method of controlling the operation of the motor 22M or the like based on the detected position of the transfer unit 21 may be combined.

The curved frame 22f connects the conveying rail guide 22h to the transfer member housing 25. The path adjusting guide 22g is attached to a corner of a curved frame 22f. The path adjusting guide 22g maintains a tension applied to the web 51 within the transfer unit 21 while the link mechanism 22a oscillates the transfer member housing 25.

When the link mechanism 22a oscillates the transfer member housing 25 so that the transfer member housing 25 is moved farther from the photoconductor drum 23 as shown in FIG. 2B, the curved frame 22f is bent so that the path adjusting guide 22g attached to the curved frame 22f protrudes to maintain the tension of the web 51 that is contacting the path adjusting guide 22g. The path adjusting guide 22g may be a decentering roller or the like.

Next, the operation of the first adjusting unit 22 of the transfer section 20 is explained with reference to FIG. 2A to FIG. 5B in detail.

When waiting for the image formation, the link mechanism 22a moves the transfer member housing 25 farther from the photoconductor drum 23 so that the web 51 is spaced apart from the photoconductor drum (FIG. 2B).

When starting the image formation, the link mechanism 22a is driven by the motor 22M to be rotated to have the link member 22L move linearly by the cam mechanism so that the web 51 is moved closer to the photoconductor drum 23, and oscillates the transfer member housing 25 connected to the link member 22L while having the oscillation shaft 25R as a center of rotation so that the transfer member housing 25 move closer to the photoconductor drum 23. As a result, the upstream introducing guide 26a and the downstream introducing guide 26b attached to the transfer member housing 25 moves closer to the photoconductor drum 23.

Further, the web 51 which is guided by the upstream introducing guide 26a and the downstream introducing guide 26b moves closer to the photoconductor drum 23 (FIG. 2A). At this time, the web 51 is positioned at the gap between the photoconductor drum 23 and the transfer member 24 along the curvature of the upstream introducing guide 26a and the downstream introducing guide 26b and the outer surface of the photoconductor drum 23. Under this condition, the transfer member 24 transfers the toner image exposed on the photoconductor drum 23 onto the web 51.

When finishing the image formation, the link mechanism 22a moves the transfer member housing 25 farther from the photoconductor drum 23 by the rotary motion of the motor 22M (in an opposite direction of the direction for starting the image formation). As a result, the upstream introducing guide 26a and the downstream introducing guide 26b attached to the transfer member housing 25 are apart from the photoconductor drum 23 (FIG. 2B). At this time, the link mechanism 22a moves the upstream introducing guide 26a and the downstream introducing guide 26b at positions where the web 51 is surely apart from the photoconductor drum 23.

The positions to which the link mechanism 22a moves the upstream introducing guide 26a and the downstream introducing guide 26b may be previously determined by an experiment or the like so that the web 51 is prevented from contacting the photoconductor drum 23 at this time.

The link mechanism 22a adjusts the distance between the transfer unit 21 and the photoconductor drum 23 based on the rigidity or the like of the web 51 when the various kinds of webs are used.

FIG. 3A to FIG. 3F are views for explaining the operation of the first adjusting unit 22 adjusting the distance between the transfer unit 21 (the upstream introducing guide 26a and the downstream introducing guide 26b) and the photoconductor drum 23, based on the rigidity or the like of the web 51.

Figure 3A:
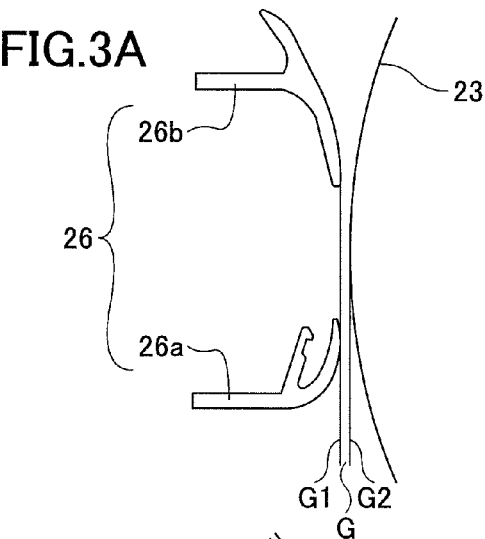
FIG. 3A to FIG. 3F are views for explaining the operation of a first adjusting unit adjusting the distance between a transfer unit and a photoconductor drum, based on the rigidity of a web.

FIG. 3A is a view for explaining the gap between the introducing guide 26 and the photoconductor drum 23. The line "G1" shown in FIG. 3A expresses a tangent line that contacts the curved surfaces of the upstream introducing guide 26a and the downstream introducing guide 26b at the web 51 side. The line "G2" shown in FIG. 3A expresses a tangent line that contacts the outer surface of the photoconductor drum 23 and is in parallel relationship with the line "G1". The distance between the lines "G1" and "G2" is referred to as a gap "G" hereinafter. The first adjusting unit 22 adjusts the gap "G" based on the rigidity or the like of the web 51.

Figure 3D:
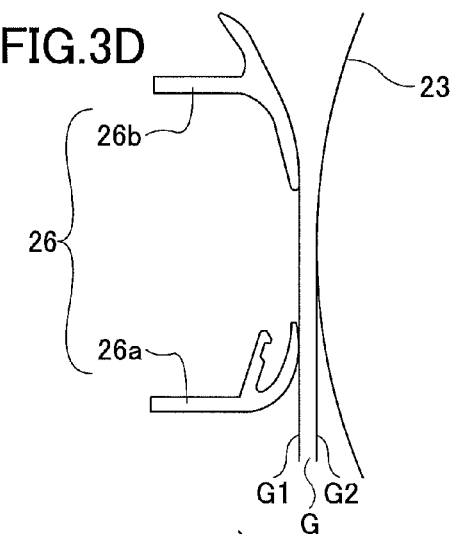

Similarly, FIG. 3D is a view for explaining the gap "G" between the introducing guide 26 and the photoconductor drum 23. The gap "G" is larger in FIG. 3D than that in FIG. 3A.

Figure 3B:
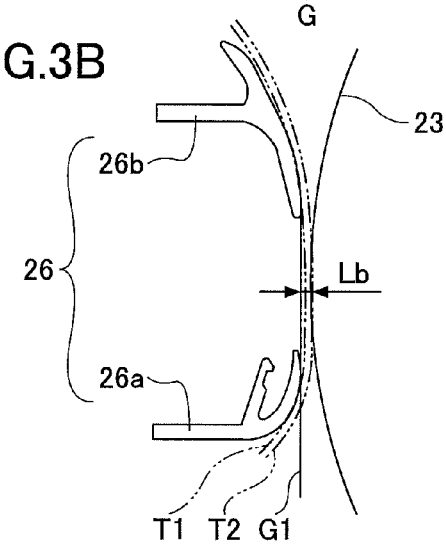

FIG. 3B is a view for explaining an expanding amount "Lb" of the web 51 in a case where the photoconductor drum 23 is not placed. The chain lines "T1" and "T2" express the shape of the cross-section of the web 51 assuming that the photoconductor drum 23 is not provided at the conveying path (assuming that the web 51 is not interfered with by the photoconductor drum 23).

Figure 3E:
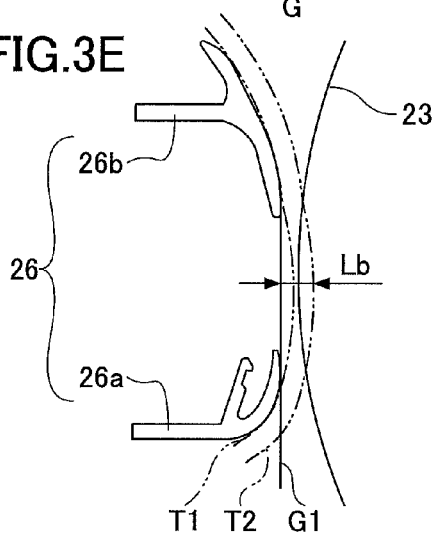

Similarly, FIG. 3E is a view for explaining the expanding amount "Lb" of the web 51 in a case where the photoconductor drum 23 is not placed. FIG. 3E shows the case where the thickness of the web 51 is greater and the rigidity of the web 51 is higher than those of the web 51 shown in FIG. 3B. The expanding amount "Lb" is a distance between the line "G1" and the chain line "T2" at a middle point between the upstream introducing guide 26a and the downstream introducing guide 26b in FIG. 3B and FIG. 3E.

When the rigidity of the web 51 is low as shown in FIG. 3B, the web 51 is conveyed at the gap between the photoconductor drum 23 and the upstream introducing guide 26a and the downstream introducing guide 26b while being positioned along the curvature of the curved surfaces of the upstream introducing guide 26a and the downstream introducing guide 26b. On the other hand, when the rigidity of the web 51 is high as shown in FIG. 3E, the web 51 is conveyed in the conveying path while being expanded toward the direction of the photoconductor drum 23.

Figure 3C:
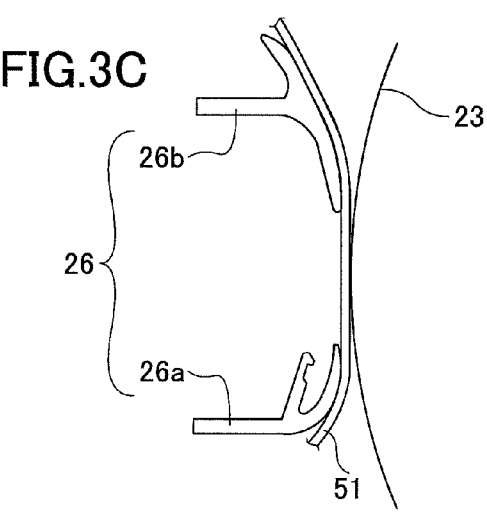
Figure 3F:
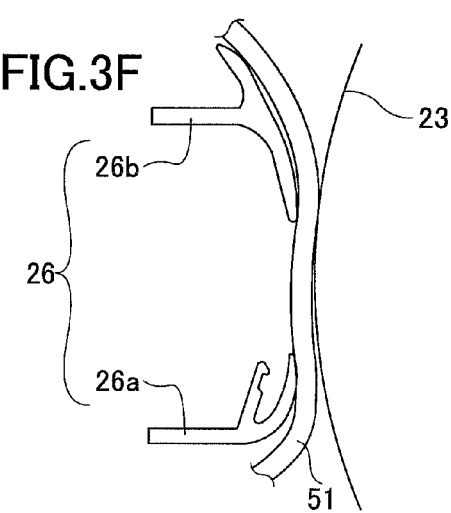

FIG. 3C and FIG. 3F are views for explaining the path of the web 51 in the conveying direction when the photoconductor drum 23 is placed corresponding to FIG. 3B and FIG. 3E, respectively.

The expanding amount "Lb" of the web 51 depends on the thickness of the recording medium, the shape of the path of the web 51 determined by the upstream introducing guide 26a and the downstream introducing guide 26b or the like, the tension applied to the web 51 or the like in addition to the rigidity of the web 51. The rigidity of the web 51 depends on the thickness of the web 51, the direction of the fiber in the web 51, a difference in moisture absorption between an outer side portion and an inner side portion of the web 51 when the web 51 is provided in a rolled form, a difference in rolled condition between the outer side portion and the inner side portion of the web 51 when the web 51 is provided in a rolled form based on the difference in curvature, or the like.

Further, generally, for a rolled paper, the rigidity becomes higher in the direction same as that of the fiber compared with the direction perpendicular to that of the fiber. In the case for a thin rolled paper (the thickness about 90 μm), the bending rigidity in the direction same as that of the fiber is about 90 to 100 mN, while in the case for a thick rolled paper (the thickness about 250 μm), the bending rigidity in the direction same as that of the fiber is about 1000 to 1200 mN. Generally, the rolled paper is conveyed with the direction same as that of the fiber as the conveying direction.

In this embodiment, the relationship between the value of the rigidity or the like of the web 51 and the value of the gap "G" is previously obtained by an experiment or the like. The link mechanism 22a of the first adjusting unit 22 obtains information of the rigidity or the like of the web 51 by an input unit or a detection unit (not shown in the drawings), refers to the relationship between the value of the rigidity or the like of the web 51 and the value of the gap "G" to obtain the value of the gap "G" corresponding to the rigidity or the like of the web 51, and adjusts the gap "G" by the rotary motion of the motor 22M or the like. The relationship may be stored in a storing unit (not shown in the drawings) or the like.

Figure 4A:
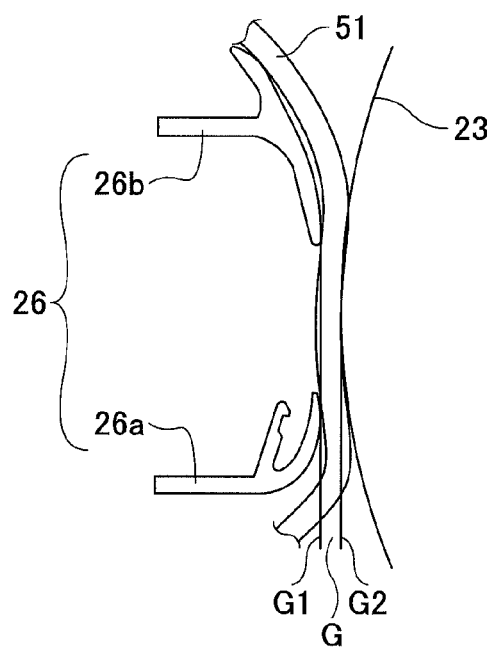
FIG. 4A is a view showing a case where a gap "G" is not adjusted.

The operation of the link mechanism 22a of the first adjusting unit 22 for adjusting the gap "G" is more specifically explained with reference to FIG. 4A, FIG. 4B, FIG. 5A and FIG. 5B. FIG. 4A is a view showing a case where the gap "G" is not adjusted although the rigidity of the web 51 is high and FIG. 4B a view showing a case where the gap "G" is adjusted when the rigidity of the web 51 is high.

For the case shown in FIG. 4A, as the rigidity of the web 51 is high, the web 51 is strongly pushed toward the photoconductor drum 23 so that the surface of the photoconductor drum 23 is rubbed by the web 51 to cause mechanical wear of the surface of the photoconductor drum 23.

Figure 4B:
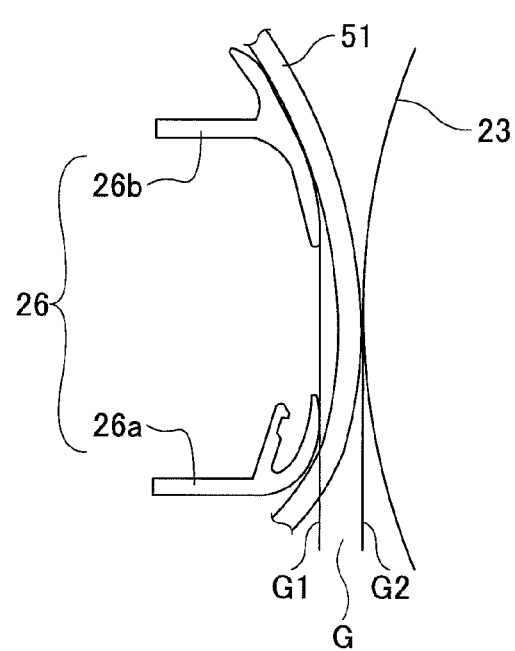
FIG. 4B a view showing a case where the gap "G" is adjusted.

According to the embodiment, also referring to FIG. 2A, the link mechanism 22a of the first adjusting unit 22 of the embodiment is driven by the motor 22M to rotate so that the link member 22L is linearly moved by the cam mechanism. With this operation, the transfer member housing 25 connected to the link member 22L is oscillated so that the transfer member housing 25 is moved apart from the photoconductor drum 23. As a result, the upstream introducing guide 26a and the downstream introducing guide 26b attached to the transfer member housing 25 are apart from the photoconductor drum 23, and the gap "G" between the upstream introducing guide 26a and the downstream introducing guide 26b, and the photoconductor drum 23 becomes large (FIG. 4B).

As described above, by adjusting the gap "G" between the upstream introducing guide 26a and the downstream introducing guide 26b, and the photoconductor drum 23, the web 51 is prevented from being pushed strongly toward the photoconductor drum 23 so that the mechanical wear of the surface of the photoconductor drum 23 by the web 51 can be suppressed. Therefore, the lifetime of the photoconductor drum 23 can be maintained.

Figure 5A:
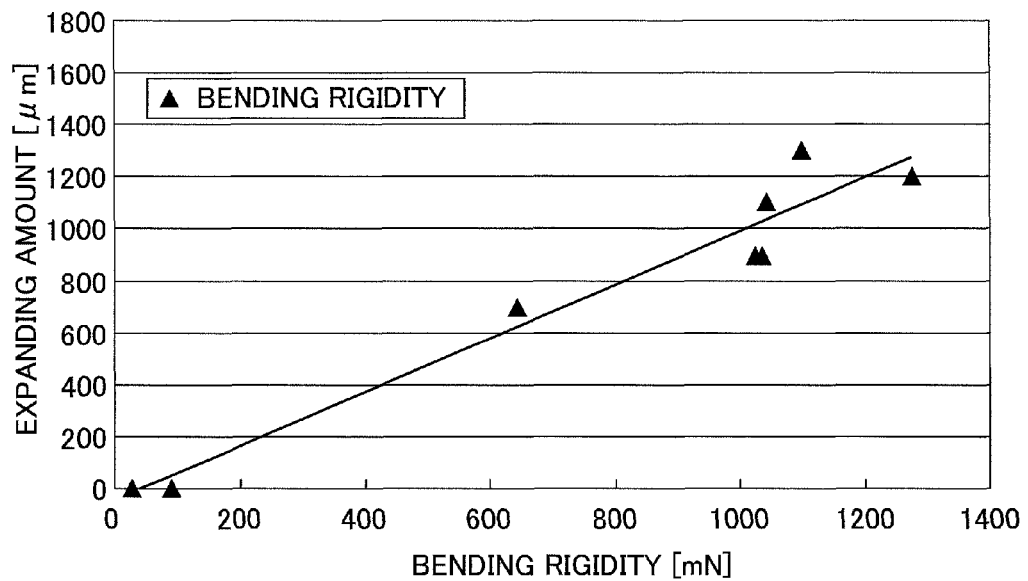
FIG. 5A and FIG. 5B are graphs respectively showing an example of a result of an experiment in which the expanding amount "Lb" of a web is obtained.
Figure 5B:
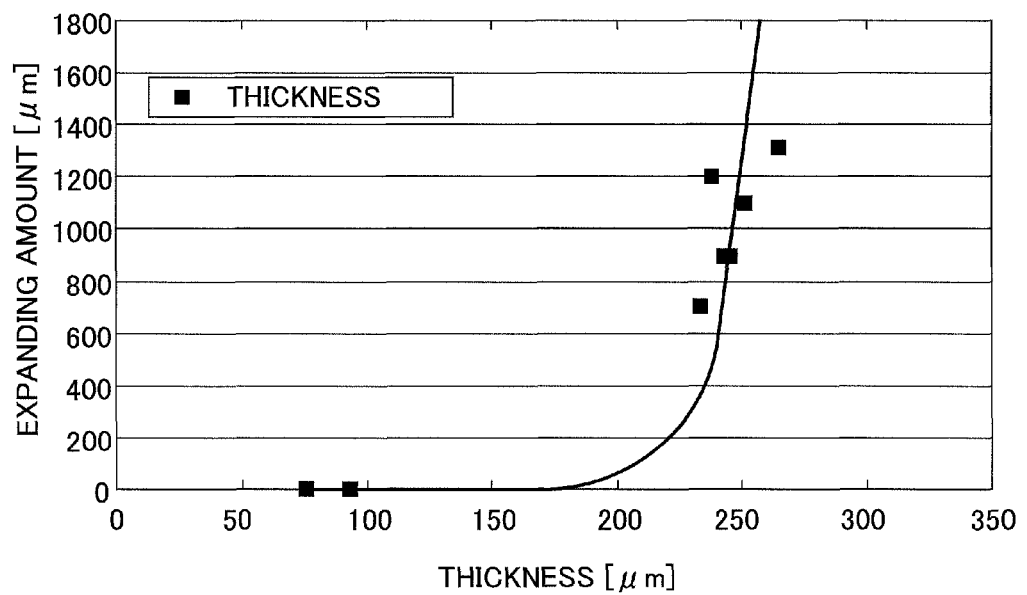

FIGS. 5A and 5B are graphs respectively showing an example of a result of an experiment in which the expanding amount "Lb" of the web 51 with respect to the bending rigidity of the web 51 is obtained. FIG. 5A shows a relationship between the bending rigidity of the web 51 and the expanding amount "Lb" of the web 51. FIG. 5B shows a relationship between the thickness of the web 51 and the expanding amount "Lb" of the web 51.

As can be understood from FIG. 5A, the expanding amount "Lb" of the web 51 is substantially in proportion by the bending rigidity of the web 51. Therefore, the expanding amount "Lb" of the web 51 may be easily obtained by multiplying a predetermined coefficient to the value of the rigidity of the web 51 obtained by the input unit or the like. Here, when the bending rigidity of the web 51 is 1000 mN, the expanding amount "Lb" of the web 51 at the transfer unit 21 is about 1000 μm.

As can be understood from FIG. 5B, the expanding amount "Lb" of the web 51 corresponds to a cube of the thickness of the web 51 when the thickness of the web 51 exceeds about 200 μm.

Table 1 shows an example of a result of an experiment for obtaining a relationship between the thickness of the paper, the density, the bending rigidity, the expanding amount and the thickness (from 60 μm).

Table 1 shows an example of the result of the experiment for a paper (A) to a paper (H) as the web (rolled paper).

In Table 1, although the thicknesses of the paper (C) and the paper (D) are similar, the bending rigidities are quite different from each other. Specifically, the thickness of the paper (C) is 234 μm and the thickness of the paper (D) is 239 μm, while the bending rigidity of the paper (C) is 644 mN, and the bending rigidity of the paper (D) is 1276 mN.

Thus, the relationship between the thickness of the web 51 and the expanding amount of the web 51 does not become a linear relationship (FIG. 5B).

On the other hand, the relationship between the bending rigidity and the expanding amount becomes a linear relationship (FIG. 5A). It means that the expanding amount correlates more with the bending rigidity than the thickness of the web 51.

As described above, it is preferable to determine a value of the gap "G" based on the rigidity (bending rigidity) of the web 51, compared with determining based on the thickness of the web 51. Further, by adjusting the value of the gap "G" based on the rigidity of the web 51, wear of the photoconductor drum 23 can be suppressed. Further the value of the gap "G" may be changed to plural values in accordance with the rigidity of the web 51.

TABLE 1

| | | DATA FOR ROLLED PAPER (CONTINUOUS FORMS PAPER) | | | | | | | |
|---|---|---|---|---|---|---|---|---|---|
| | | PAPER (A) | PAPER (B) | PAPER (C) | PAPER (D) | PAPER (E) | PAPER (F) | PAPER (G) | PAPER (H) |
| THICKNESS | μm | 75 | 92 | 234 | 239 | 243 | 245 | 252 | 266 |
| DENSITY | g/cm$^3$ | 0.69 | 0.74 | 0.63 | 0.87 | 0.89 | 0.86 | 0.85 | 0.79 |
| BENDING RIGIDITY | mN | 27 | 87 | 644 | 1276 | 1025 | 1035 | 1045 | 1098 |
| EXPANDING AMOUNT | μm | 0 | 0 | 700 | 1200 | 900 | 900 | 1100 | 1300 |
| THICKNESS (FROM 60 μm) | μm | 15 | 32 | 174 | 179 | 183 | 185 | 192 | 206 |

As shown in Table 1, when the thickness of the web 51 is 250 μm, the expanding amount of the web 51 becomes about 1000 μm (see the papers (F) and (G), for example).

The link mechanism 22a calculates the corresponding expanding amount "Lb" based on the bending rigidity of the web 51 (more preferably, based on the bending rigidity and the thickness of the web 51) obtained by the input unit or the detection unit (not shown in the drawings) from the graphs shown in FIG. 5A and FIG. 5B. Then, the link mechanism 22a adjusts the gap "G" based on the expanding amount "Lb".

The link mechanism 22a may adjust the gap "G" when starting the image formation, while forming the image, or while waiting for the image formation. In this embodiment, the higher the rigidity of the web 51 becomes, the larger the gap "G" becomes.

Next, the conveying section 30 and the ejecting section 40 of the image forming apparatus 10 are explained in detail with reference to FIG. 6.

Figure 6:
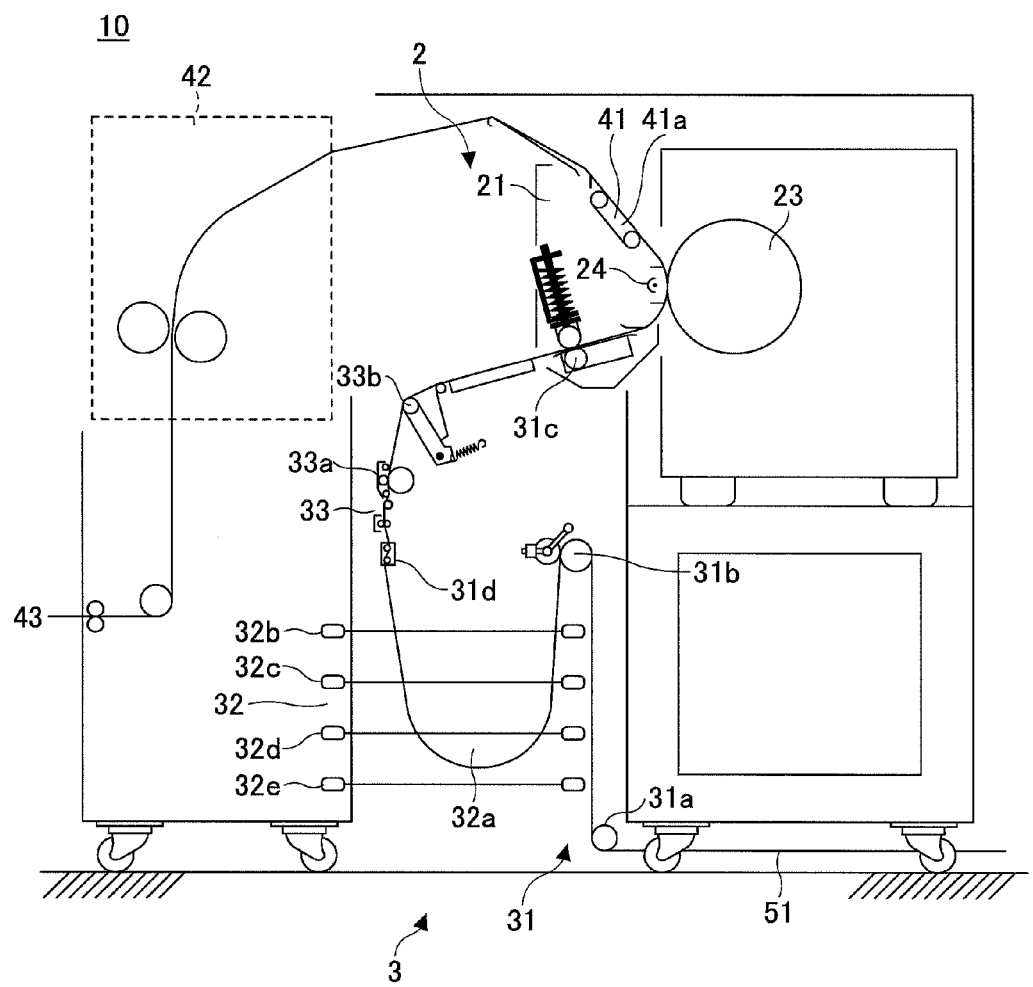
FIG. 6 is a plan view showing an example of the image forming apparatus of an embodiment.

FIG. 6 is a plan view showing an example of the image forming apparatus 10 of the embodiment.

The conveying section 30 includes the recording medium supplying unit 31, the recording medium buffer unit 32, the tension applying unit 33 and the like.

The recording medium supplying unit 31 includes a medium supplying roller 31a, a drawing roller 31b, a transfer unit introducing roller 31c, an edge guide 31d and the like. The recording medium buffer unit 32 includes a buffer mechanism 32a, recording medium buffer sensors 32b to 32e and the like. The tension applying unit 33 includes a pushing roller 33a, a tension guide 33b and the like.

The web 51 that contacts the drawing roller 31b is drawn into the buffer mechanism 32a of the recording medium buffer unit 32 by the rotary motion of the drawing roller 31b and temporarily maintained. The buffer mechanism 32a detects the existence of the web 51 by the recording medium buffer sensors 32b to 32e and calculates the loose amount of the web 51. The recording medium buffer unit 32 adjusts the drawing rate of the drawing roller 31a based on the loose amount of the web 51 to maintain the loose amount of the web 51 at a predetermined amount.

Then, the conveying unit 3 corrects waves of the web 51 by the edge guide 31d which is positioned at the downstream direction of the recording medium buffer unit 32 to apply an appropriate tension to the web 51 by the pushing roller 33a for suppressing the generation of waves or folding.

In this embodiment, although it is assumed that the web 51 does not include perforations, a rolled paper having perforations may be used instead. In such a case, the rolled paper having perforations is conveyed by a tractor mechanism and the unit including the pushing roller 33a may be restructured. Further, when using a fanfold web (BOX paper having perforations) as pin members of the tractor mechanism are engaged with the perforations of the web, the web is conveyed outside of the tension applying unit 33. This example will be explained in the following with reference to FIG. 11B as a third embodiment in detail.

Subsequently, the transfer unit introducing roller 31c conveys the web 51 to the upstream introducing guide 26a or the like which is positioned at the downstream direction. Thereafter, the transfer unit 2 transfers the toner image onto the web 51 which is conveyed to the gap (or space) between the photoconductor drum 23 and the transfer member 24.

Then, the operation of the ejecting section 40 is explained. The ejecting section 40 includes the adsorbing ejecting unit 41, the fixing unit 42, the ejecting unit 43 and the like. The adsorbing ejecting unit 41 includes an adsorbing ejecting belt 41a. The fixing unit 42 includes a heater and a compressing unit (not shown in the drawings).

The adsorbing ejecting unit 41 attracts a surface of the web 51, which is opposite to the surface where the toner image is transferred, by the adsorbing ejecting belt 41a. Under this state, the adsorbing ejecting unit 41 moves the web 51 in the downstream direction by the movement of the adsorbing ejecting belt 41a in the downstream direction.

Further, the fixing unit 42 which is positioned at the downstream direction heats the web 51 to a toner transferring temperature of the toner image by the heater (not shown in the drawings) to melt the toner on the web 51. Then, by compressing the web 51 by the compressing unit (not shown in the drawings), the toner on the web 51 is fixed.

Subsequently, the web 51 is conveyed to the ejecting unit 43 which is positioned outside of the image forming apparatus 10 and the image formation is finished.

Second Embodiment

In a second embodiment, the image forming apparatus 10 further includes a second adjusting unit 27 (an example of the adjusting unit) in addition to the structure of the image forming apparatus 10 of the first embodiment. The structure of the image forming apparatus 10 in the second embodiment, other than the second adjusting unit 27, is the same as that of the first embodiment, therefore, explanation is not repeated.

Figure 7:
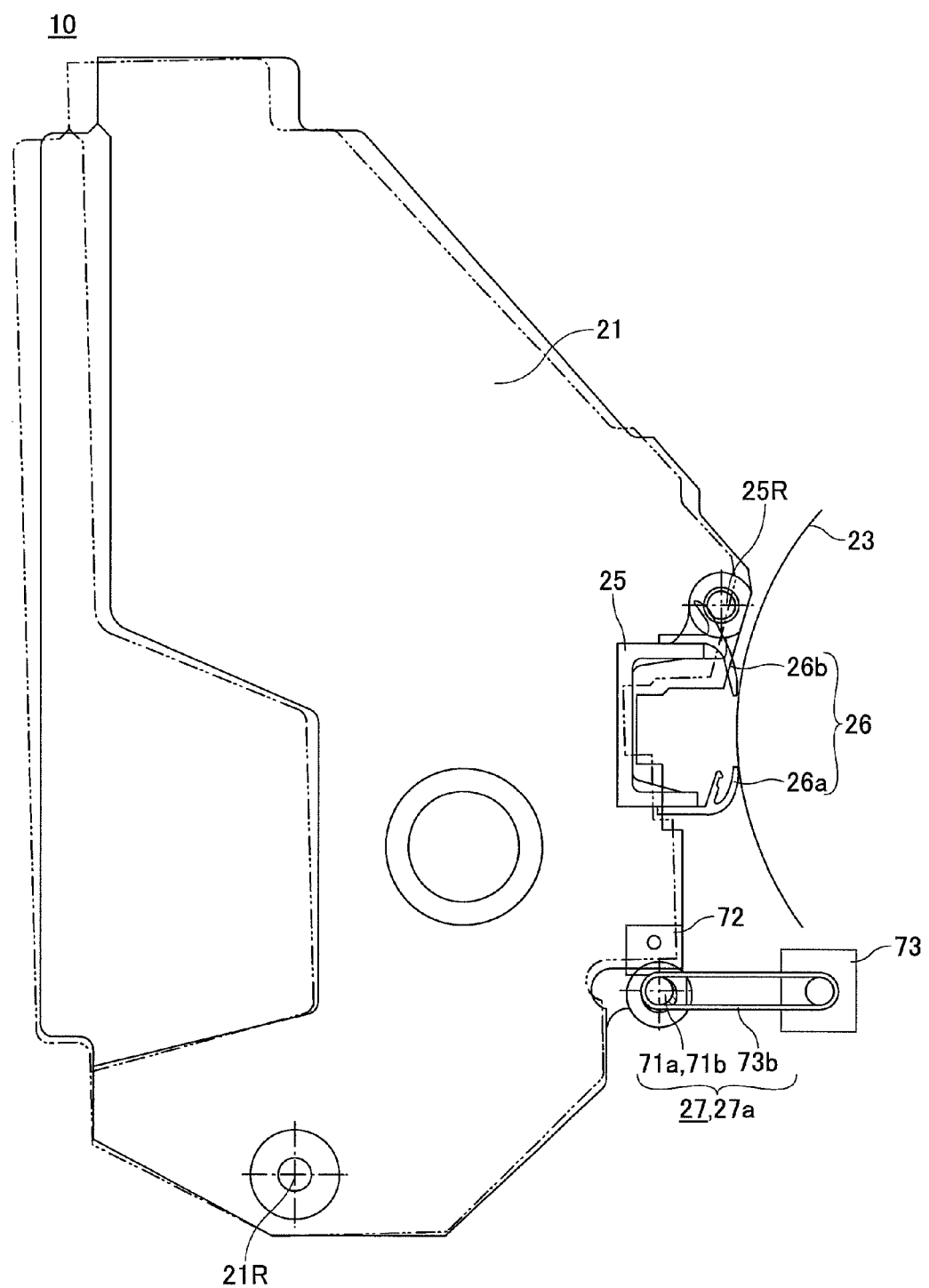
FIG. 7 is a view for explaining the operation of the rotation of a transfer unit by a second adjusting unit.

FIG. 7 is a view for explaining the operation of the rotation of the transfer unit 21 by the second adjusting unit 27. The second adjusting unit 27 of the embodiment is a cam mechanism 27a including a cam shaft 71a, an eccentric cam 71b, a motor 73 and the like. Alternatively, the second adjusting unit 27 of the embodiment may be any mechanisms, other than the cam mechanism 27a, such as a stepping motor, an electromagnetic force actuator or the like, for example, that can move the transfer unit 21 closer to and farther from the photoconductor drum 23 by a linear or rotary motion.

Figure 8A:
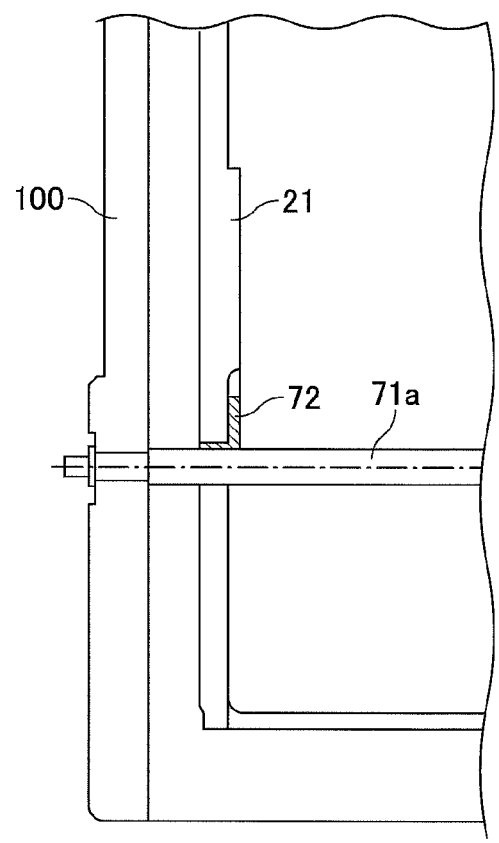
FIG. 8A is a view showing a case where the image forming apparatus does not include a cam mechanism.

The cam shaft 71a is rotatably supported by a transfer frame 100, which will be explained with reference to FIG. 8A and FIG. 8B, that includes the photoconductor drum 23 in its inside. The eccentric cam 71b is provided at the cam shaft 71a and has a curved surface provided to change a contacting radius in accordance with the rotational angle of the cam shaft 71a so that the curved surface contacts a contacting block 72 of the transfer unit 21. In this embodiment, the eccentric cam 71a is provided at the cam shaft 71b to cover the cam shaft 71b so that a change of design is minimum and an upgrade of the design may also be possible.

The motor 73 is a power source for rotating the cam shaft 71a. The motor 73 rotates the cam shaft 71a via the belt 73b. In this embodiment, the motor 73 is a stepping motor. However, any other power source that can rotate the cam shaft 71a may be arbitrarily used instead of the motor 73.

Generally, an image forming apparatus is designed such that the transfer unit 21 is capable of being rotatably apart from the photoconductor drum 23 in order to recover from a paper jam. The image forming apparatus 10 also has such a structure where the transfer unit 21 is capable of being rotatably apart from the photoconductor drum 23.

In the cam mechanism 27a, the eccentric cam 71b is also rotated with the cam shaft 71a when the cam shaft 71a is rotated. Further, as described above, the contacting radius of the eccentric cam 71b with respect to the center of the cam shaft 71a changes so that when the eccentric cam 71b is rotated with the cam shaft 71a while contacting the contacting block 72 the position of the contacting block 72 is changed. As a result, the transfer unit 21 including the contacting block 72 is rotated by the rotary motion of the eccentric cam 71b to change the gap "G" between the transfer unit 21 and the photoconductor drum 23.

The operation of the cam mechanism 27a is explained in detail with reference to FIG. 7, FIG. 8A and FIG. 8B. FIG. 8A shows a case where the image forming apparatus 10 does not include the cam mechanism 27a (the eccentric cam 71b).

Figure 8B:
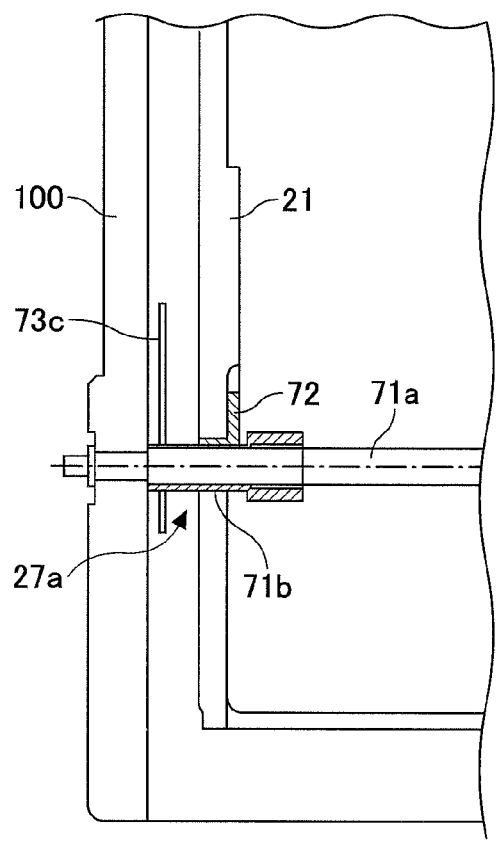
FIG. 8B is a view showing a case where the image forming apparatus includes a cam mechanism.

FIG. 8B shows a case where the image forming apparatus 10 includes the cam mechanism 27a (the eccentric cam 71b) of the embodiment.

The cam mechanism 27a driven by the motor 73, rotates the cam shaft 71a via the belt 73b so that the eccentric cam 71b is also rotated. At this time, the position of the contacting block 72 of the transfer unit 21 that contacts the eccentric cam 71b is changed in accordance with the phase of the eccentric cam 71b. As a result, the angle of the transfer unit 21 is changed while having the rotary shaft 21R as a center of the rotation to change the gap "G" between the transfer unit 21 and the photoconductor drum 23. The cam mechanism 27a changes the phase of the eccentric cam 71b based on the expanding amount "Lb" corresponding to the rigidity or the like of the web 51 to adjust the gap "G" to an appropriate value.

As the rotational radius of the first adjusting unit 22 for adjusting the gap "G" explained in the first embodiment is smaller than that of the second adjusting unit 27, it is possible for the first adjusting unit 22 to perform a fine adjustment for the value of the gap "G". Therefore, the first adjusting unit 22 is preferable for a high accuracy adjustment of the gap "G". Further, as the first adjusting unit 22 only rotates the transfer member housing 25, but not all of the transfer unit 21, energy consumption is reduced.

On the other hand, as the rotational radius of the second adjusting unit 27 for adjusting the gap "G" is larger than that of the first adjusting unit 22, it is possible for the second adjusting unit 27 to largely change the value of the gap "G". Further, for the second adjusting unit 27, as the position of all of the transfer unit 21 is changed, there is no change for the path of the web 51 within the transfer unit 21. Therefore, the web 51 is stably conveyed. Further, an inclined angle of the transfer unit 21 by the rotary motion of the second adjusting unit 27 is about 0.1 to 0.5° (degrees), there is little influence in conveying the web 51 at the upstream and the downstream of the transfer unit 21.

The gap "G" may be adjusted by the combination of the first adjusting unit 22 and the second adjusting unit 27 at the same time.

The image forming apparatus 10 moves the web 51 apart from the photoconductor drum 23 when waiting for the image formation. However, when the web 51 with high rigidity is conveyed, and if the expanding amount "Lb" is larger than the gap "G" while waiting for the image formation, the web 51 is kept in contact with the photoconductor drum 23. In this case, the web 51 may be soiled by the remaining toner on the photoconductor drum 23, or the photoconductor drum 23 may be damaged by the contacting web 51.

The second adjusting unit 27 is capable of adjusting the gap "G" when waiting for the image formation to have the web 51 apart from the photoconductor drum 23. Further, for the second adjusting unit 27, as described above, the path of the web 51 is not changed so that a developing cost with respect to the conventional apparatus may be small.

Instead of using the motor 73 as shown in FIG. 7, the cam shaft 71a may be manually rotated to take two or more different positions.

Figure 9A:
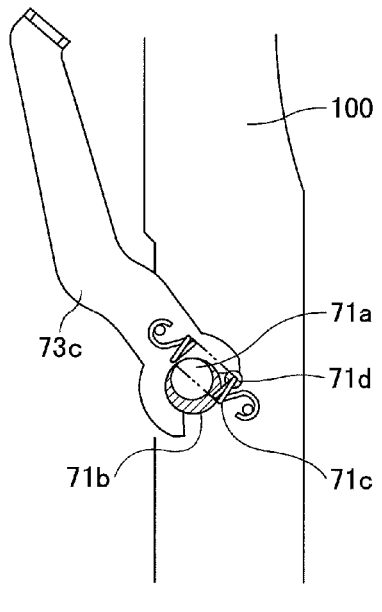
FIG. 9A, FIG. 9B and FIG. 9C are views showing an example of a structure of a transfer frame to which a manual lever for rotating a cam shaft is provided.
Figure 9B:
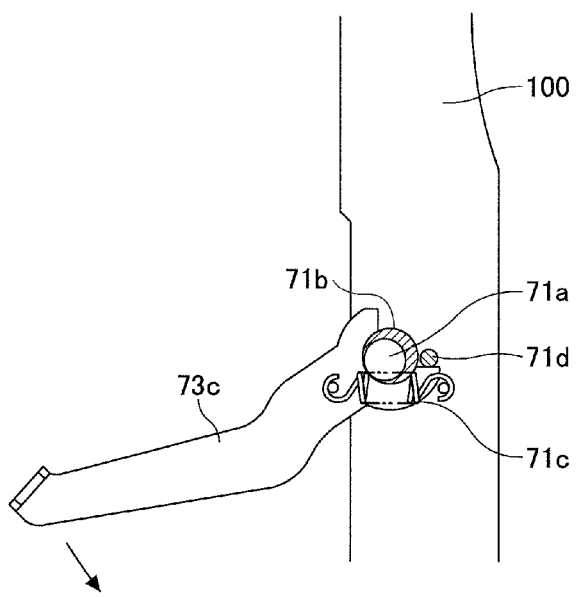

FIG. 9A and FIG. 9B are views showing a structure of the transfer frame 100 to which a manual lever 73c for rotating the cam shaft 71a is provided.

The image forming apparatus 10 further includes the manual lever 73c, a spring 71c and a stopper 71d provided on the transfer frame 100. The spring 71c is attached to the manual lever 73c to push the manual lever 73c in a clockwise direction by a spring force of the spring 71c as shown in FIG. 9A. The manual lever 73c pushed by the spring force of the spring 71c is again stopped by the stopper 71d. When a user rotates the manual lever 73c in a counter clockwise direction as shown in FIG. 9B, the manual lever 73c is stopped by the stopper 71d. Therefore, the manual lever 73c is capable of fixing the phase of the cam shaft 71a at two positions so that the gap "G" can be set for two positions.

In this embodiment, the developing unit, an optical unit, the static eliminator, the cleaner or the like are mounted on the transfer frame 100.

Figure 9C:
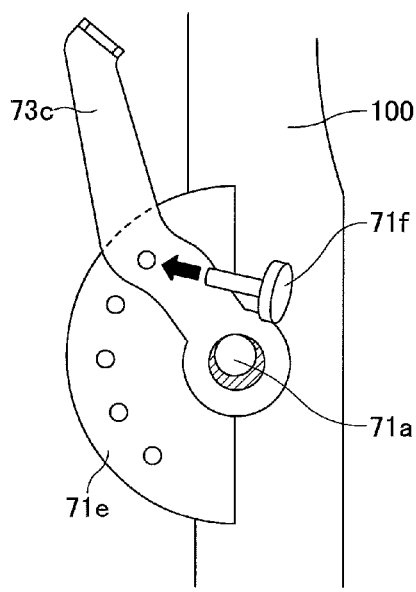

FIG. 9C shows a case where a plate 71e provided with plural holes is provided at a backside of the manual lever 73c. In this case, the manual lever 73c is also provided with a hole. Then, the manual lever 73c is fixed to take plural positions by engaging the hole provided in the manual lever 73c and the corresponding holes provided in the plate 71e by a pin 71f. In this case, the rotary motion of the manual lever 73c is fixed at plural positions corresponding to the holes provided to the plate 71e. Therefore, the value for the gap "G" can be set for the corresponding plural values.

Third Embodiment

In a third embodiment, the image forming apparatus 10 adjusts the gap "G" based on the kind of the conveying section 30. The basic structure of the image forming apparatus 10 in the third embodiment is the same as that of the first embodiment and the second embodiment, therefore, explanation is not repeated. For the kind of the conveying section 30, there is a roller conveying unit that conveys a web having no perforations, a tractor conveying unit that conveys a web having perforations, or the like.

Generally, the tractor conveying unit can apply a larger tension to the web 51 compared to the roller conveying unit. Thus, when using the tractor conveying unit, compared with a case when using the roller conveying unit, the expanding amount "Lb" becomes small. Therefore, if the gap "G" is set similar to the case when using the roller conveying unit even when the tractor conveying unit is used, there may be a case where the web 51 does not sufficiently contact the photoconductor drum 23 so that the image is not properly transferred to the web 51. Therefore, the gap "G" is set smaller for the tractor conveying unit compared with the case when using the roller conveying unit. In this embodiment, the image forming apparatus 10 is configured to set the value of the gap "G" based on the kind of the conveying section 30 such that when the tractor conveying unit is used, the value of the gap "G" is set smaller compared with the case when the roller conveying unit is used.

The embodiment is explained with reference to FIG. 10, FIG. 11A and FIG. 11B.

Figure 10:
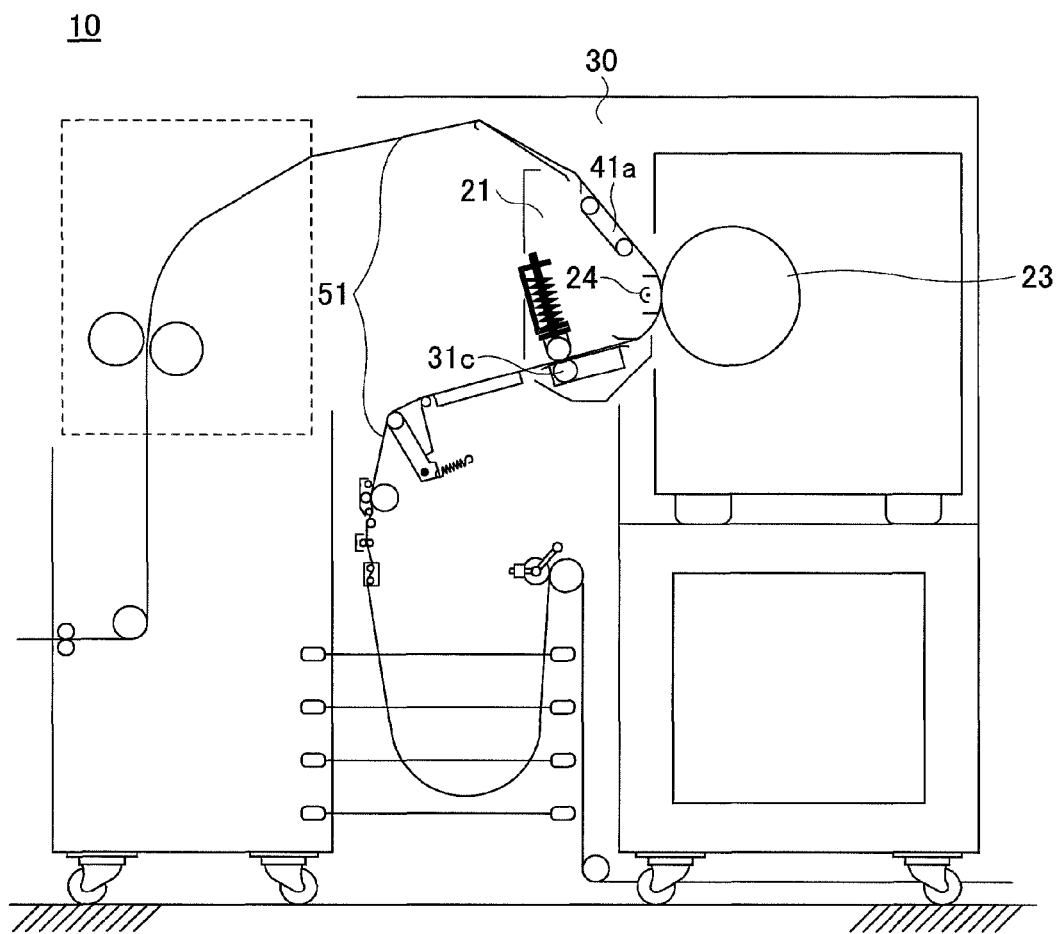
FIG. 10 is a view showing a case where a rolled web having no perforations is conveyed.

FIG. 10 shows a case where a rolled web 51 having no perforations is conveyed by the roller conveying unit in the conveying section 30. FIG. 11A and FIG. 11B show a case where a rolled web 51 having perforations is conveyed by the tractor conveying unit in the conveying section 30.

In FIG. 10, the conveying section 30 includes the roller conveying unit that conveys the web 51 by the transfer unit introducing roller 31c which is positioned upstream of the transfer member 24 in the conveying direction and the adsorbing ejecting belt 41a which is positioned downstream of the transfer member 24 in the conveying direction. The tension applied to the web 51 is generated by rotating the adsorbing ejecting belt 41a faster (about 103% with respect to the speed of the transfer unit introducing roller 31c) than the transfer unit introducing roller 31c. At this time, the adsorbing ejecting belt 41a and the web 51 repeatedly slip in the small areas and the maximum force that is applied to the web 51 when such a slip does not occur becomes the tension to be applied to the web 51.

The transfer unit introducing roller 31c and the adsorbing ejecting belt 41a of the roller conveying unit shown in FIG. 10 are placed at the center portion of the conveying path of the web 51 except the ends of the web 51 in the width direction.

Figure 11A:
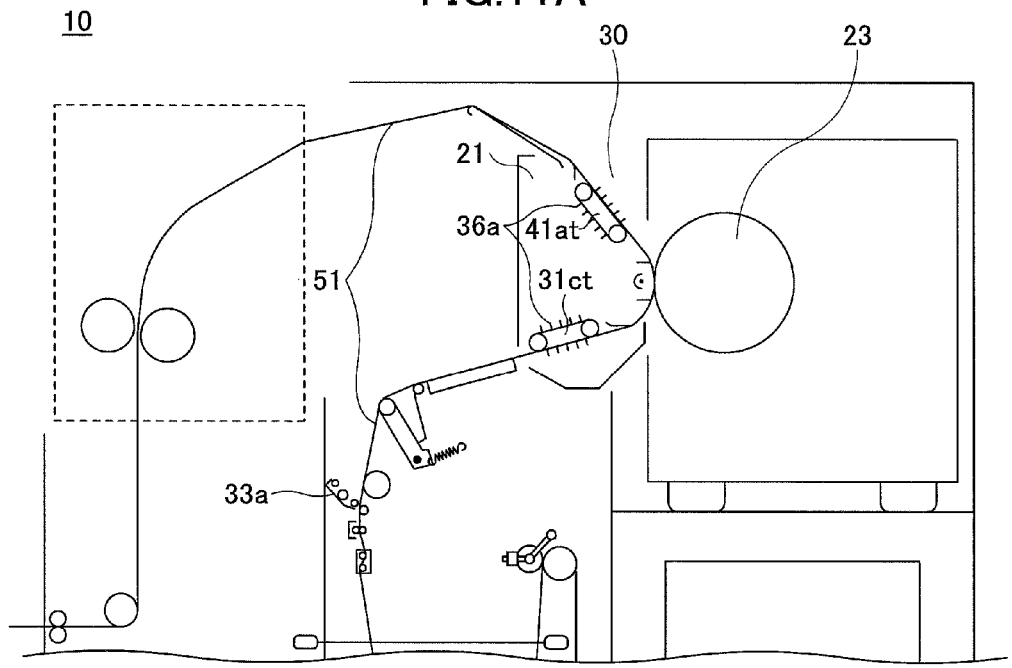
FIG. 11A and FIG. 11B are views showing a case where a rolled web with perforations is conveyed.

For the case shown in FIG. 11A, the web 51 is provided with plural perforations at both ends in a direction perpendicular to the conveying direction of the web 51. In this case, the conveying section 30 includes the tractor conveying unit including an upstream tractor 31ct and a downstream tractor 41at. The upstream tractor 31ct and the downstream tractor 41at respectively include plural pins 36a which engage with the perforations of the web 51. Thus, in this case, the web 51 is conveyed while the perforations are being engaged with the pins 36a of the upstream tractor 31ct and the downstream tractor 41at.

Figure 11B:
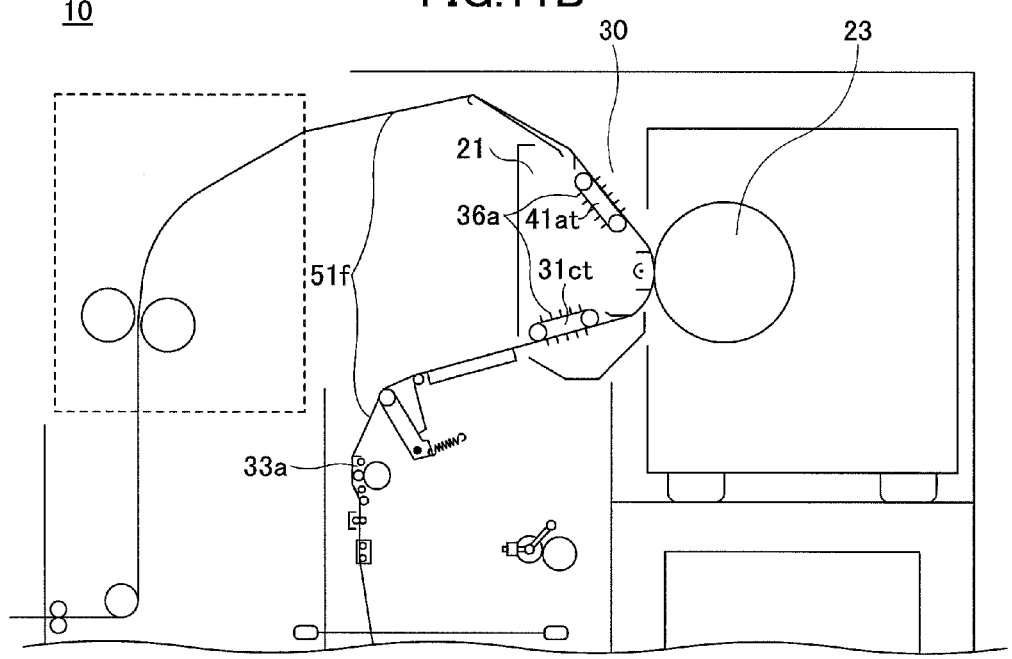

FIG. 11B shows a case when the tractor conveying unit conveys a fanfold web 51f (BOX paper having perforations). When conveying the fanfold web 51f, the pushing roller 33a is closed and the fanfold web 51f is conveyed outside of the pushing roller 33a.

The upstream tractor 31ct and the downstream tractor 41at of the tractor conveying unit shown in FIG. 11A and FIG. 11B are placed at the ends of the conveying path of the web 51 (or the fanfold web 51f).

The expanding amount "Lb" of the web 51 may be suppressed by increasing the tension applied to the web 51, for example by increasing the speed of the downstream tractor 41at or the like. However, when the tension applied to the web 51 is increased, a load is also applied to the perforations of the web (or the fanfold web 51f) to deform the perforations. Further, for the case of using the roller conveying unit (pinless conveyance), the expanding amount "Lb" of the web 51 may be suppressed by increasing the speed of the adsorbing ejecting belt 41a. However, in this case as well, the web 51 may be deformed.

According to the embodiment, the distance between the transfer unit 21 and the photoconductor drum 23 is adjusted based on the rigidity of the web and the kind of the conveying section 30. Thus, it is not necessary to increase the speed of the adsorbing ejecting belt 41a or the downstream tractor 41at and the quality of printing can be maintained.

Fourth Embodiment

In the fourth embodiment, the image forming apparatus 10 similar to the image forming apparatus 10 of the first embodiment to the third embodiment further includes a detection unit 80. The structure of the image forming apparatus 10 except the detection unit 80 is the same as those of the first embodiment to the third embodiment and explanation is not repeated.

Figure 12:
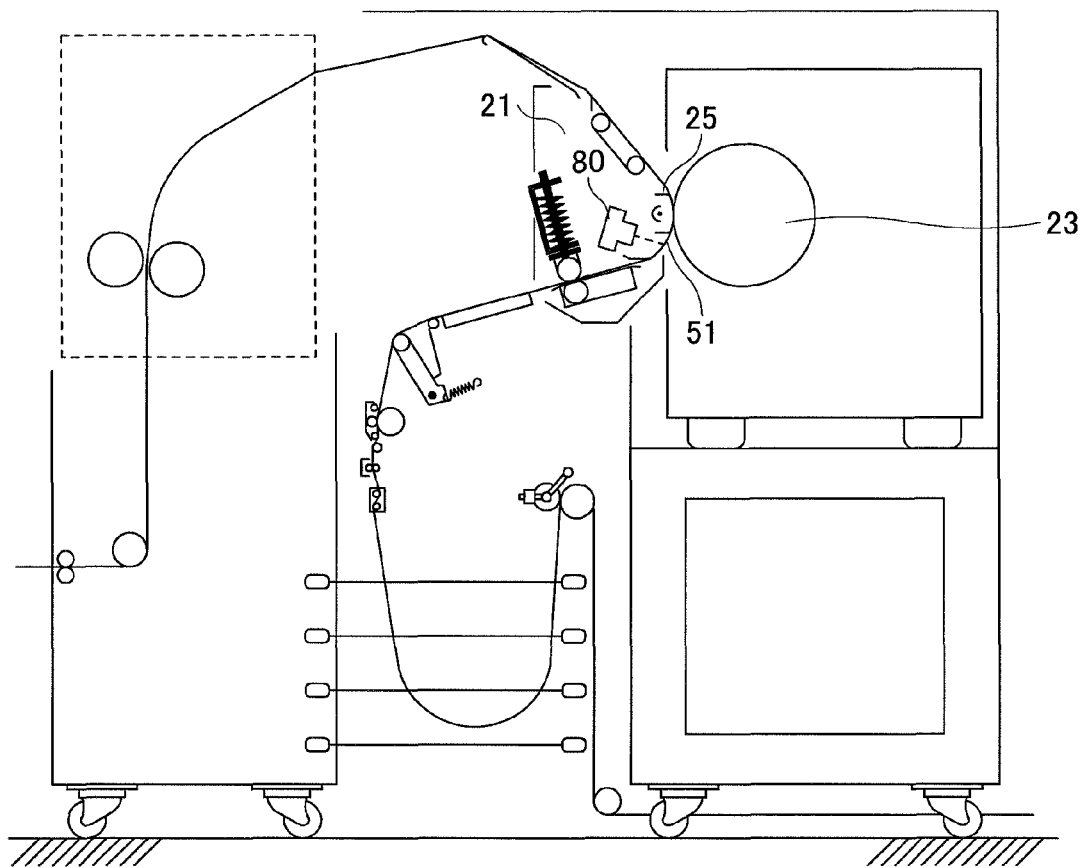
FIG. 12 is a plan view showing another example of the image forming apparatus of an embodiment.

FIG. 12 is a plan view showing another example of the image forming apparatus 10 of the embodiment.

As shown in FIG. 12, the image forming apparatus 10 of the embodiment further includes the detection unit 80 that detects the rigidity of the web 51 (including the fanfold web 51f, the same as hereinafter).

The detection unit 80 is provided at a position where the web 51 is warping (not tensioned, for example, at the upstream of the transfer member housing 25). The detection unit 80 measures the distance to the web 51, and detects the rigidity of the web 51 based on the difference between the measured distance and a predetermined value by comparing the measured distance with the predetermined value. Specifically, the longer the distance to the web 51, the higher the detection unit 80 detects for the rigidity of the web 51.

The detection unit 80 may be any kind of measuring apparatus capable of measuring the distance to a target object, by an eddy current, by electric capacity, by supersonic, optically, or the like. Further, the detection unit 80 may be provided at a position where the web 51 is warped in proportion to the rigidity of the web 51 such as in the recording medium buffer unit 32, the tension applying unit 33 or the like.

In this embodiment, the first adjusting unit 22 or the second adjusting unit 27 adjusts the gap "G" based on the value detected by the detection unit 80. Further, the detection unit 80 may detect the rigidity of the web 51 while performing the image formation at predetermined intervals. Then, the first adjusting unit 22 or the second adjusting unit 27 may adjust the detection unit 80 based on the value detected by the detection unit 80. Further, the first adjusting unit or the second adjusting unit 27 may adjust (change) the gap "G" when the difference between the value of the gap "G" calculated based on the previous detection and the value of the gap "G" calculated based on the current detection is larger than a predetermined threshold value.

With this, the gap "G" can be appropriately adjusted even for the case when the rigidity of the web 51 changes while performing the image formation as follows. Such a case as there is a difference in rigidity caused by a difference in moisture absorption between an outer side portion and an inner side portion of the web 51 when the web 51 is provided in a rolled form, caused by a difference in rolled condition between the outer side portion and the inner side portion of the web 51 when the web 51 is provided in a rolled form based on the difference in curvature or the like.

Further, the image forming apparatus 10 may further include a detection unit (not shown in the drawings) that detects the thickness of the web 51. In this case, the value of the gap "G" may be determined based on the detected thickness of the web 51 in addition to the rigidity of the web 51.

Fifth embodiment

In the fifth embodiment, the image forming apparatus 10 similar to the image forming apparatus 10 of the first embodiment to the fourth embodiment further includes an input unit 90. The structure of the image forming apparatus 10 except the input unit 90 is the same as those of the first embodiment to the fourth embodiment and explanation is not repeated.

Figure 13:
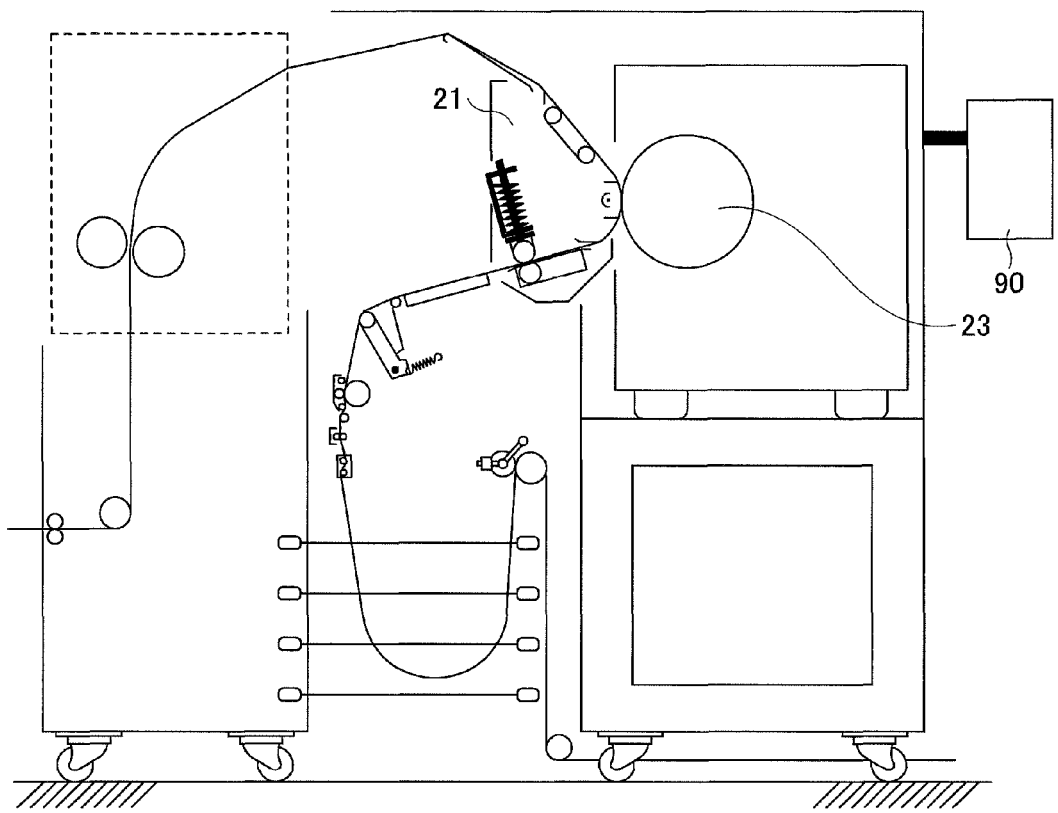
FIG. 13 is a plan view showing another example of the image forming apparatus of an embodiment.

FIG. 13 is a plan view showing an example of the image forming apparatus 10 of the embodiment.

As shown in FIG. 13, the image forming apparatus 10 of the embodiment further includes the input unit 90 that inputs information (data) about the web 51. In this embodiment, the first adjusting unit 22 or the second adjusting unit 27 adjusts the gap "G" based on the information input by the input unit 90.

The information input by the input unit 90 includes information necessary for the image formation such as the thickness of the web 51, the rigidity of the web 51, necessary rotational angle of the cam shaft 71a, the value of the gap "G", a control pattern of combination of the first adjusting unit 22 and the second adjusting unit 27, information for selecting the kind of the web 51 among plural kinds of webs which are previously input, values or selecting information based on a pre-experiment or the like. Thus, an operator may select and set an optimal value for the gap "G" even for a client who uses various kinds of recording mediums.

Figure 14:
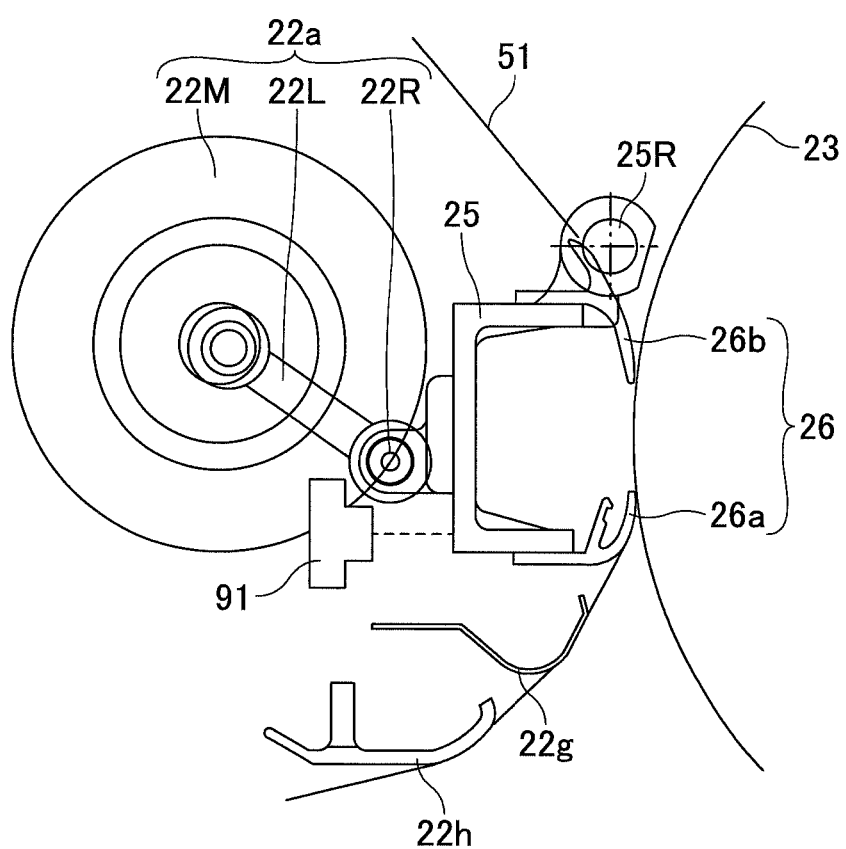
FIG. 14 is a view for explaining a first gap sensor of a transfer unit of an embodiment.

FIG. 14 is a view showing a part of the image forming apparatus 10 including a first gap sensor 91. The first gap sensor 91 detects the gap "G" adjusted by the first adjusting unit 22. Specifically, the first gap sensor 91 detects the gap "G" between the photoconductor drum 23 and the guide unit 26 by detecting the position of the transfer member housing 25.

Figure 15:
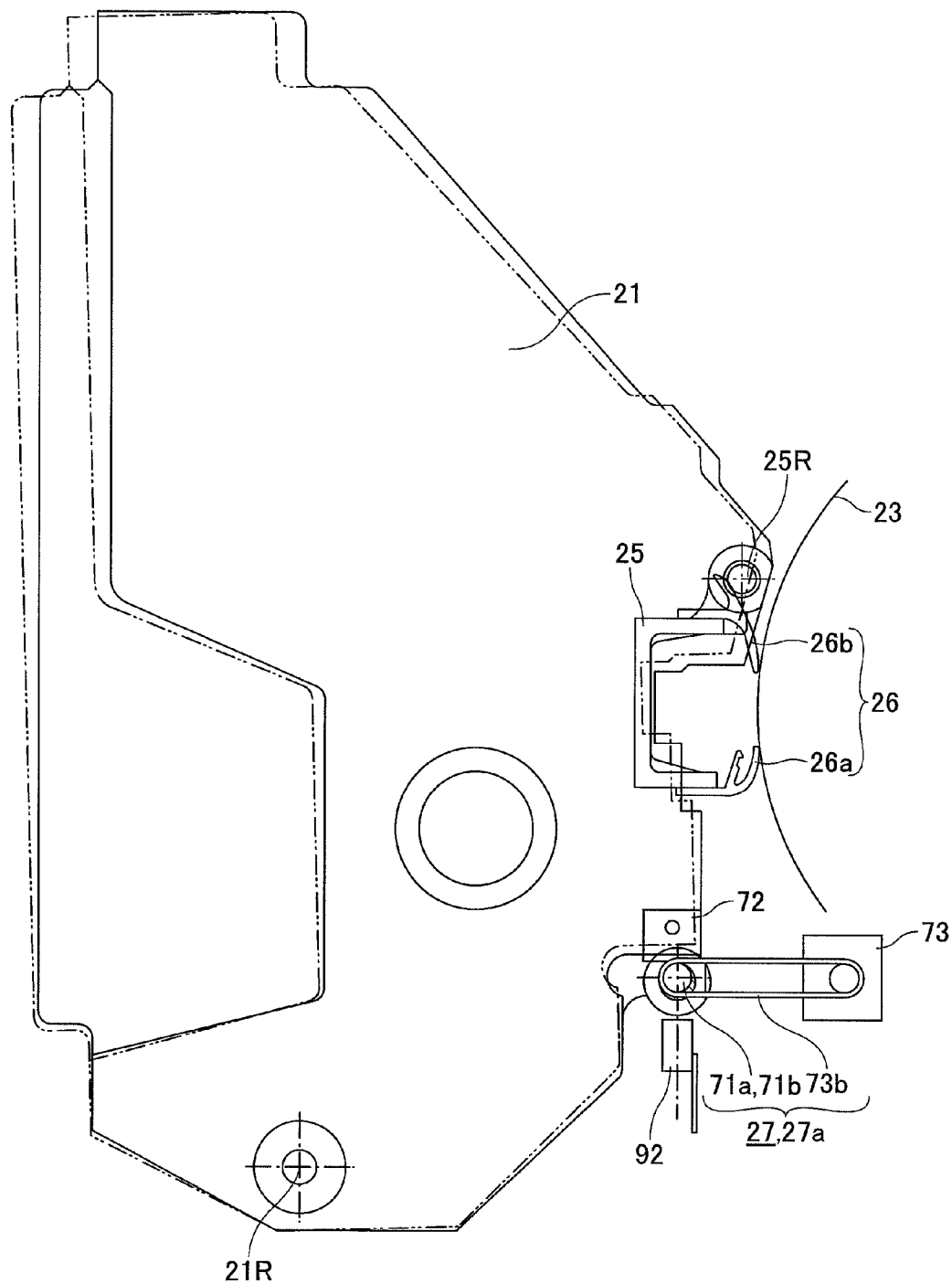
FIG. 15 is a view for explaining a second gap sensor of the transfer unit of an embodiment.

FIG. 15 is a view showing a part of the image forming apparatus 10 including a second gap sensor 92. The second gap sensor 92 detects the rotational position of the eccentric cam 71b adjusted by the second adjusting unit 27. The second gap sensor 92 detects the rotational angle of the transfer unit 21 by detecting the rotational position of the eccentric cam 71b.

The image forming apparatus 10 of the embodiment may further include the detection unit 80 as explained in the fourth embodiment with reference to FIG. 12.

In such a case, the input unit 90 (or a control unit included in the image forming apparatus 10) may compare the rigidity of the web 51 input by the input unit 90 and the rigidity of the web 51 detected by the detection unit 80. The input unit 90 may output an error alarm or the like to alert the operator or the like when the input value is determined to be inappropriate. Specifically, the input unit 90 may output the alarm or the like when the difference between the values of the rigidity of the web 51 detected by the detection unit 80 and input by the input unit 90 is more than or equal to a predetermined threshold value. With this, operational errors by the operator can be prevented even when various kinds of the webs are used.

Further, when adjusting the gap "G" by the manual lever 73c as explained above with reference to FIG. 9A to FIG. 9C, the input unit 90 (or the control unit) may compare the value of the gap "G" calculated based on the value detected by the first gap sensor 91 with the value of the gap "G" calculated based on the value of the rigidity detected by the detection unit 80. Then, the input unit 90 (or the control unit) may output an alarm or the like when the gap "G" set by the operator or the like using the manual lever 73c is determined to be inappropriate. Further, similarly, the input unit 90 (or the control unit) may compare the value of the gap "G" calculated based on the value detected by the second gap sensor 92 with the value of the gap "G" calculated based on the value of the rigidity detected by the detection unit 80, and may output an alarm or the like when the gap "G" set by the operator or the like using the manual lever 73c is determined to be inappropriate. With this, operational errors by the operator can be prevented even when various kinds of the webs are used.

According to the image forming apparatus 10 of the embodiment, wear of the photoconductor drum 23 can be suppressed even when various kinds of recording mediums are used.

Further, the embodiments may be applicable as well to an image forming apparatus including another kind of photosensitive body such as a photosensitive belt or an intermediate transferring body such as a drum or belt as an image holding body instead of the photoconductor drum 23.

The present invention is not limited to the specifically disclosed embodiments, and variations and modifications may be made without departing from the scope of the present invention.

The present application is based on Japanese Priority Application No. 2011-118927 filed on May 27, 2011, and Japanese Priority Application No. 2012-116969 filed on May 22, 2012, the entire contents of which are hereby incorporated herein by reference.

What is claimed is:
1. An image forming apparatus comprising:
an image holding body on which a toner image is formed;

a transfer unit that functions to transfer the toner image formed on the image holding body onto a recording medium;

an adjusting unit that adjusts a gap between the transfer unit and the image holding body based on bending rigidity of the recording medium, the recording medium being conveyed through the gap with respect to the image holding body; and a detection unit provided at a position where the recording medium is warping, the detection unit detecting the bending rigidity of the recording medium at a predetermined interval, wherein the adjusting unit adjusts the gap based on the bending rigidity of the recording medium detected by the detection unit;

wherein the transfer unit includes a transfer member, a transfer member housing that supports the transfer member and is provided with an opening portion at a side facing the image holding body, and a guide unit that includes a first introducing guide and a second introducing guide provided at the opening portion of the transfer member housing to face the image holding body such that the recording medium is conveyed along surfaces of the first introducing guide and the second introducing guide, the gap being a distance between the surfaces of the first introducing guide and the second introducing guide and the image holding body, and wherein the adjusting unit includes a link mechanism including a link member that is linearly moved and is rotatably connected to the transfer member housing to oscillate the housing with the first introducing guide and the second introducing guide such that the first introducing guide and the second introducing guide are moved closer to or farther from the image holding body.

2. The image forming apparatus according to claim 1, wherein the transfer unit includes a transfer member that transfers the toner image formed on the image holding body onto the recording medium and a transfer member housing that includes the transfer member in its inside, and the adjusting unit adjusts the gap by oscillating the transfer member housing with respect to the image holding body.

3. The image forming apparatus according to claim 1, wherein the transfer unit is rotatably supported, and the adjusting unit adjusts the gap by rotating the transfer unit with respect to the image holding body.

4. The image forming apparatus according to claim 1, further comprising:

a conveying unit that conveys the recording medium with respect to the image holding body, and wherein the adjusting unit adjusts the gap based on the kind of the conveying unit.

5. The image forming apparatus according to claim 1, wherein the adjusting unit adjusts the gap when the difference between a gap calculated based on the bending rigidity of the recording medium previously detected by the detection unit and a gap calculated based on the bending rigidity of the recording medium currently detected by the detection unit becomes larger than or equal to a predetermined threshold value.

6. The image forming apparatus according to claim 1, further comprising:

an input unit that inputs information about the recording medium, and wherein the adjusting unit adjusts the gap based on the information input by the input unit.

7. The image forming apparatus according to claim 6, wherein the information input by the input unit includes the thickness of the recording medium, and the adjusting unit adjusts the gap based on the thickness of the recording medium and the bending rigidity of the recording medium.

8. The image forming apparatus according to claim 1, wherein the bending rigidity of the recording medium is obtained based on a difference between a measured distance measured by the detection unit and a predetermined value by comparing the measured distance with the predetermined value.

9. The image forming apparatus according to claim 1, wherein the bending rigidity of the recording medium is obtained based on a measured distance measured by the detection unit.

10. The image forming apparatus according to claim 9, wherein the detection unit is provided upstream of the transfer unit.

11. The image forming apparatus according to claim 1, wherein the bending rigidity of the recording medium is obtained based on a difference between a measured distance measured by the detection unit and a predetermined value by comparing the measured distance with the predetermined value.

12. The image forming apparatus according to claim 1, wherein the adjusting unit adjusts a distance of the gap between the transfer unit and the image holding body based on bending rigidity of the recording medium.

13. The image forming apparatus according to claim 1, wherein the adjusting unit adjusts the gap between the transfer unit and the image holding body based on the bending rigidity of the recording medium such that the gap becomes larger when the bending rigidity of the recording medium is higher.

14. A method of forming an image by an image forming apparatus including an image holding body on which a toner image is formed and a transfer unit, comprising:

adjusting a gap between the transfer unit and the image holding body based on bending rigidity of a recording medium which is to be conveyed through the gap with respect to the image holding body; and transferring the toner image formed on the image holding body onto the recording medium;

wherein the bending rigidity of the recording medium is obtained based on a measured distance measured by a detection unit that is provided at a position where the recording medium is warping;

wherein the transfer unit includes a transfer member, a transfer member housing that supports the transfer member and is provided with an opening portion at a side facing the image holding body, and a guide unit that includes a first introducing guide and a second introducing guide provided at the opening portion of the transfer member housing to face the image holding body such that the recording medium is conveyed along surfaces of the first introducing guide and the second introducing guide, the gap being a distance between the surfaces of the first introducing guide and the second introducing guide and the image holding body, and wherein in the adjusting the gap, the housing is oscillated with the first introducing guide and the second introducing guide such that the first introducing guide and the second introducing guide are moved closer to or farther from the image holding body.

15. The method of forming an image according to claim 14, wherein the bending rigidity of the recording medium is obtained based on a difference between the measured distance and a predetermined value by comparing the measured distance with the predetermined value.

16. The method of forming an image according to claim 14, Wherein in the adjusting the gap, a distance of the gap between the transfer unit and the image holding body is adjusted based on bending rigidity of the recording medium.

17. The method of forming an image according to claim 14, wherein in the adjusting the gap, the gap between the transfer unit and the image holding body is adjusted based on the bending rigidity of the recording medium such that the gap becomes larger when the bending rigidity of the recording medium is higher.

* * * * *